Aug. 5, 1947.  A. A. KOEPFER  2,424,989
AERIAL PHOTOGRAPHIC IMAGE MOTION COMPENSATING SYSTEM
Filed Sept. 13, 1945
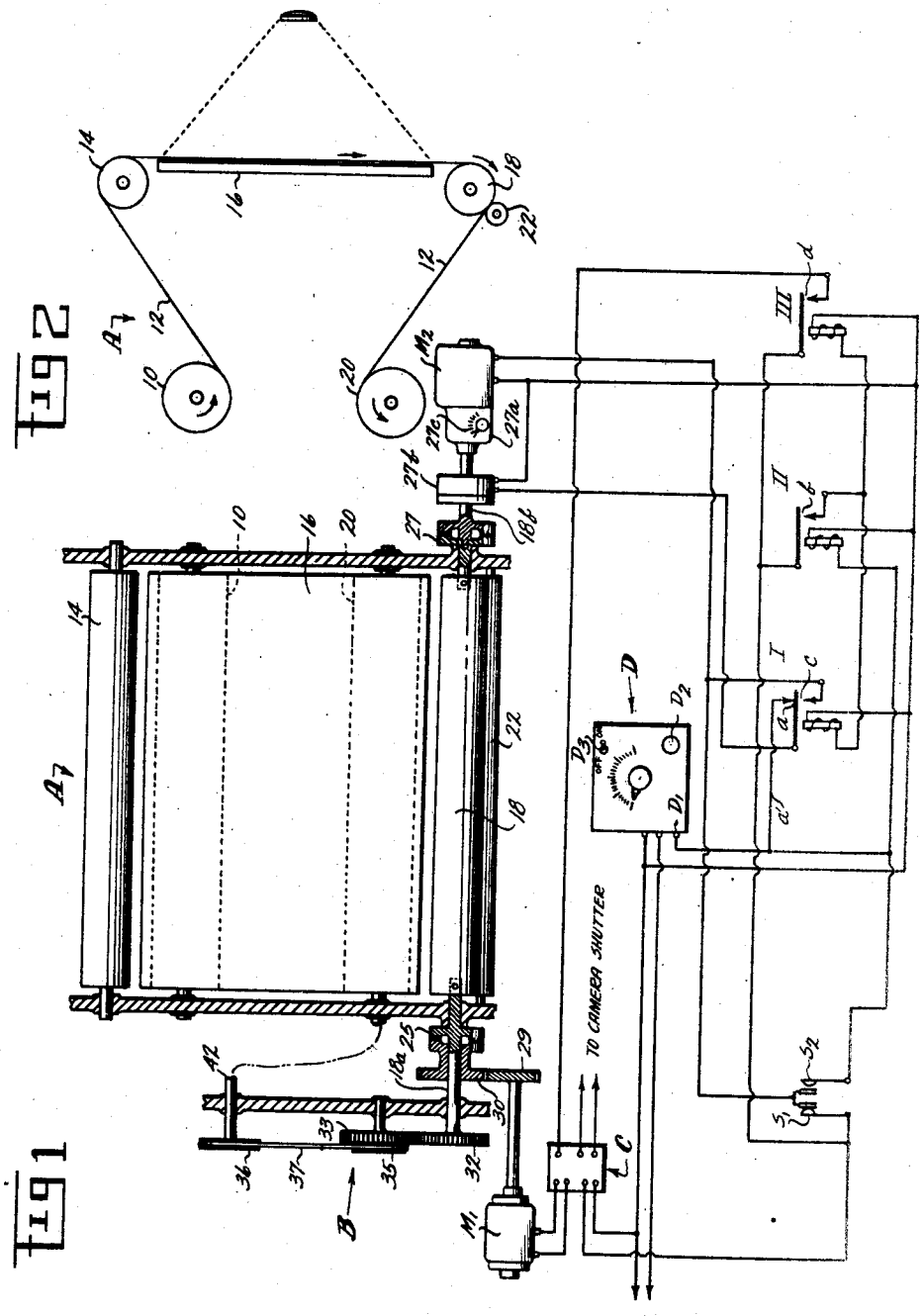
-INVENTOR-
AELRED A. KOEPFER
BY
-ATTORNEYS-

UNITED STATES PATENT OFFICE 2,424,989

AERIAL PHOTOGRAPHIC IMAGE MOTION COMPENSATING SYSTEM

Aelred A. Koepfer, Dayton, Ohio

Application September 13, 1945, Serial No. 616,140

2 Claims. (Cl. 95—12.5)

(Granted under the act of March 3, 1883, as amended April 30, 1928; 370 O. G. 757)

The invention described herein may be manufactured and used by or for the Government for governmental purposes without payment to me of any royalty thereon.

This invention relates to aerial cameras and more particularly to devices for eliminating image blurring due to motion of an associated aircraft relative to the subject terrain.

The blurring effect is directly proportional to the velocity of the associated aircraft and inversely proportional to the altitude. Such blurring effect may be substantially eliminated by pulling film, in the direction of flight, across the focal plane of the camera during exposure at a rate determined by the velocity and altitude of the aircraft and equal to the effective rate of image travel on the focal plane of the camera.

Accordingly, it is an object of my invention to provide a film actuating system capable of compensating for image motion in the direction of flight resulting from the forward movement of the aircraft during exposure.

It is another object of my invention to provide a system selectively operable for intermittent exposure at selected intervals in conjunction with a conventional intervalometer.

It is a further object of my invention to provide my system with means whereby "runaway" operation may be obtained wherein the intermittent exposures have an interval between exposures depending entirely on the recycling characteristics of the camera, i. e., the rate at which unexposed film is brought into position for exposure.

A still further object of my invention is to provide my system with means for night operation wherein intermittent exposure control may be replaced by conventional photocell control responsive to flash bomb illumination.

I accomplish my purposes by providing a combination of novel elements in conjunction with certain conventional elements, namely, by providing an auxiliary or synchronizing motor capable of driving the film at a speed which is synchronized by a variable speed transmission with the rate of travel of the image on the focal plane of the camera as determined by the velocity and altitude of the associated aircraft. This synchronizing motor is so arranged with respect to a conventional film driving roller and coupled through a novel electrical circuit in such a manner that the film driving roller is brought up to synchronizing speed prior to tripping of the camera shutter so as to avoid inertia effects in the mechanism. I also employ a conventional constant speed recycling motor and a conventional electrical control system in conjunction therewith for energizing the recycling motor responsive to completion of each exposure so as to wind up the exposed film and pull unexposed film into place for a subsequent exposure, in accordance with known principles. Certain novel elements are provided so that the wind-up reel is driven at a rate determined by the rate of rotation of the driving roller at all times whereby film is wound up either at a constant recycling rate, or, during exposure, at a rate determined by the synchronized speed of the film. The recycling and the synchronizing motors are so coupled to the film driving roller that rotation of the latter is effected by whichever motor is rotating faster at any particular time so that although both motors may be running simultaneously under certain conditions, the film driving roller rotates at that rate of speed which is required for recycling or synchronizing at that time.

Other features and objects of my invention will be apparent from the detailed description which now follows with reference to the appended drawing in which:

Fig. 1 shows schematically the mechanical and electrical elements of my system; and Fig. 2 is a side view of a portion of the film roller assembly disclosed in Fig. 1.

With reference to the figures of the drawing, a film roller assembly A of generally conventional form is shown, having a magazine roller 10 for carrying unexposed film 12 which is threaded around a guide roller 14 and held against a backing plate 16, being pulled past plate 16 by a driving roller 18 and wound up after exposure on a wind-up reel 20. The film 12 is omitted in Fig. 1 for clarity. A pressure roller 22 is indicated, the pressure roller being optional. The mechanical system thus far described is generally conventional. My invention consists of combining the roller assembly with a dual drive comprising a continuous shaft 18a and a discontinuous shaft 18b pinned, as shown, to opposite ends of roller 18 and also to members of conventional overdrive clutches 25 and 27. For proper operation these clutches should be of the spring biased type having virtually no lost motion. Clutch 25 is adapted to be driven by a constant speed recycling motor $M_1$ whereas clutch 27 is adapted to be driven by a synchronizing motor $M_2$ through a variable speed transmission 27a and a normally disengaged electromagnetic clutch 27b. Transmission 27a is provided with an adjusting knob and scale arrangement 27c calibrated in inches per second of film travel speed. The arrangement is such that roller 18 may be driven by either $M_1$ or $M_2$ depending on the relative rates of speed imparted to the driving members of clutches 25 and 27, roller 18 obviously rotating at the faster rate as will be understood from consideration of the relative slant of the engaging protuberances of clutches 25 and 27. A gear train and friction drive B is associated with the roller 18 in such a manner that should $M_1$ be rotating, the clutch 25 will actuate roller 18 through gears 29 and 30, the gear 30 being intergral with the driving side of clutch 25 thus forming an integral rotary member which is not pinned to shaft 18a but freely rotatable with respect thereto. Rotation of roller 18 causes rotation of gears 32 and 33 to actuate a friction drive comprising pulleys 35 and 36 having a slippable belt 37 therebetween. Pulley 36 is pinned to a shaft 42 coupled to the wind-up reel 20 as indicated on Fig. 1, and causes rotation of that roller with some slipping of belt 37 since the diameter of reel 20 increases as film is wound on it, in accordance with known practice. It will be noted that the wind-up reel 20 is rotated at a rate determined by the rate of rotation of roller 18 so that the wind-up function is performed at a speed commensurate with either the recycling speed or the synchronizing speed.

An electrical control circuit is provided comprising a conventional motor control device C which energizes the motor $M_1$ at the end of each exposure responsive to closing of the camera shutter and which automatically maintains energization of motor $M_1$ for the length of time necessary to pull the proper extent of unexposed film 12 into place for a subsequent exposure. Control device C is connected to the other elements of my circuit in a manner which will be fully understood by persons skilled in the art in order to obtain the conventional functions of such devices. The electrical circuit also includes an intervalometer D of conventional construction having an impulse transmitting terminal $D_1$, manual impulse button $D_2$ and an "off-on" switch $D_3$. Also included is a plurality of relays I, II and III, as well as manually operable switches $S_1$ and $S_2$. Relay I is a slow release type, while relays II and III effect a time delay in tripping of the camera shutter which is responsive to closing of relay III, this relay serving to energize the control device C which trips the camera shutter in a manner familiar to persons skilled in the art. The wiring arrangement and the characteristics of the relays is such that during intervalometer controlled operation with $S_3$ in the "on" position, in daylight with transmission 27a set by means of control knob and scale 27c to rotate at a proper synchronizing speed as determined by an operator in a fully understood manner for specific flight conditions, and the switch $S_1$ normally closed as shown, an impulse from the terminal $D_1$ of the intervalometer is conducted to the solenoid of relay II and simultaneously to the normally disengaged electromagnetic clutch 27b through the normally closed contact a engaging the armature of relay I. Thus, the impulse serves to cause engagement of the clutch 27b so as to bring the driving roller 18 up to the speed of the transmission 27a. At the same time relay 2 is closed at b, causing energization of relays I and III, the contact d of relay III being connected to the device C so that an impulse is conducted thereto effecting tripping of the camera shutter.

Inasmuch as the intervalometer impulse through contact a is of short duration, continued energization of clutch 27b is effected at contact c responsive to energization of relay I upon the closing of relay II contact at b, relay I having a characteristic of retentivity wherein contact is maintained at c for a period equal at least to the delay time occasioned by relays III plus the exposure time.

The purpose of contact disengagement at a is to prevent current from feeding back through the lead a' from a to the solenoid of relay II which would cause continuous energization of that relay and thereby defeat the intermittent operation of the circuit as effected by the intervalometer. The sequential energization of relays II and III provides a delay before tripping of the shutter, this delay being equal at least to the time required to bring the driving roller 18 up to synchronized speed. The short interruption in energization of clutch 27b due to energization of relay I is insufficient to cause any appreciable loss in synchronized speed of roller 18, the time delay arrangement of relays II and III thus ensuring the occurrence of tripping after roller 18 has been brought up to synchronized speed. Ordinarily, the impulse from the intervalometer is relied on to be of sufficient duration to bring roller 18 up to synchronized speed prior to energization of relay I, but in any event a choice of relays may be made to provide the proper time relations to suit any given duration of intervalometer impulse.

When runaway operation of the camera is desired, with switch $S_1$ closed, $S_2$ open and $S_3$ in the "off" position and $M_2$ running, the push button $D_2$ on the intervalometer is pressed, whence continuous current from terminal $D_1$ is supplied to relay 2, thereby causing continuous contact at b and also continuous engagement of clutch 27b. Likewise, continuous contact at d is effected which causes a continuous shutter tripping current to flow to the control device C so that the shutter is continuously tripped at intervals depending on the film pulling speed of motor $M_1$, automatic operation of control device C being characteristic and inherent in such devices to cause the proper amount of unexposed film to be brought into place for exposure prior to tripping of the shutter.

For night operation the switches $S_1$ and $S_2$ are closed and with motor $M_2$ running film is continually pulled past the backing plate 16 at synchronized speed. Under these circumstances the intervalometer D is rendered ineffective and the tripping circuit of the camera is connected directly to a photocell (not shown), and tripping is responsive to the flashes of illuminating bombs in a manner well understood and in use at the present time. Upon completion of each exposure motor $M_1$ recycles by virtue of operation of the electrical control device C, as heretofore explained.

In order to obtain manually controlled operation, switches $S_1$ and $S_2$ are opened and switch $D_3$ on the intervalometer is placed in the "off" position whereby momentary pressing of the push-button $D_2$ energizes relay II which, in turn, energizes relay III causing tripping of the camera, it being understood that the function of motor $M_2$ is then eliminated and no synchronizing speed provided for roller 18. For standard intermittent operation by intervalometer control, $S_1$ and $S_2$ are opened and the intervalometer switch $D_3$ placed in the "on" position whence photographs are taken at predetermined intervals, there being likewise in such case no compensation for image travel.

Having thus described my invention, I claim:

1. In an aerial camera, a system for compensating for image travel on the focal plane of the camera comprising a film driving means to advance the film across the focal plane of the camera, a synchronizing motor, means for varying the transmission speed of the synchronizing motor to advance the film across the focal plane at a predeterminable rate to compensate for the rate of image travel on the focal plane of the camera during the exposure of the film, a recycling motor for advancing the film across the focal plane between exposures to position an unexposed portion of the film in the focal plane for the next exposure, clutch means between the synchronizing motor and the film driving means, means for tripping the shutter of the camera including delayed action operating means between the shutter tripping means and the clutch means for engaging the clutch means to advance the film and subsequently actuate the shutter tripping means, whereby the film driving means may attain synchronized speed prior to the opening of the shutter.

2. In an aerial camera, a system for compensating for image travel on the focal plane of said camera comprising film advancing means for advancing the film across the focal plane of said camera at predetermined speeds comprising a speed synchronizing motor for advancing the film to maintain the rate of film travel and the rate of image travel in the focal plane coincident during the exposure, a recycling motor for advancing the film across the focal plane between exposures at a higher rate than during exposures, overrunning clutch means between the speed synchronizing motor and the film advancing means, overrunning clutch means between the recycling motor and the film advancing means, whereby the film advancing means may be driven by either of the motors independently of the operation of the other motor, means for varying the speed of the synchronizing motor for driving the film advancing means at a predetermined rate to compensate for the rate of image travel in the focal plane of the camera during exposure of the film, normally disengaged electro-magnetic clutch means between the synchronizing motor and the overrunning clutch for that motor, an energizing circuit connected to the electro-magnetic clutch means to cause engagement thereof when the circuit is energized to bring the rate of movement of the film advancing means up to a predetermined speed ratio relative to the speed of the speed synchronizing motor, a relay connected in said circuit to be energized thereby, a second relay having slow release characteristics arranged to be energized by said first relay to interrupt the circuit to the electro-magnetic clutch means, a secondary energizing circuit for said electro-magnetic clutch means arranged to be closed by said second relay when energized substantially simultaneously with the interruption of the first mentioned electro-magnetic clutch energizing circuit, a third relay having an energizing circuit therefor arranged to be closed by the first relay when the first relay is energized, and a camera shutter tripping circuit control device arranged to be energized by said third relay simultaneously with the energizing of the second relay for energizing the shutter tripping circuit to make the exposure.

AELRED A. KOEPFER.

REFERENCES CITED

The following references are of record in the file of this patent:

UNITED STATES PATENTS

| Number | Name | Date |
| --- | --- | --- |
| 1,413,187 | Paumier | Apr. 18, 1922 |
| 1,586,071 | Cooke | May 25, 1926 |
| 1,612,860 | Fairchild | Jan. 4, 1927 |